F. F. OGIER.
DIRIGIBLE AUTOMOBILE LAMP.
APPLICATION FILED JAN. 3, 1911.
988,135.
Patented Mar. 28, 1911.
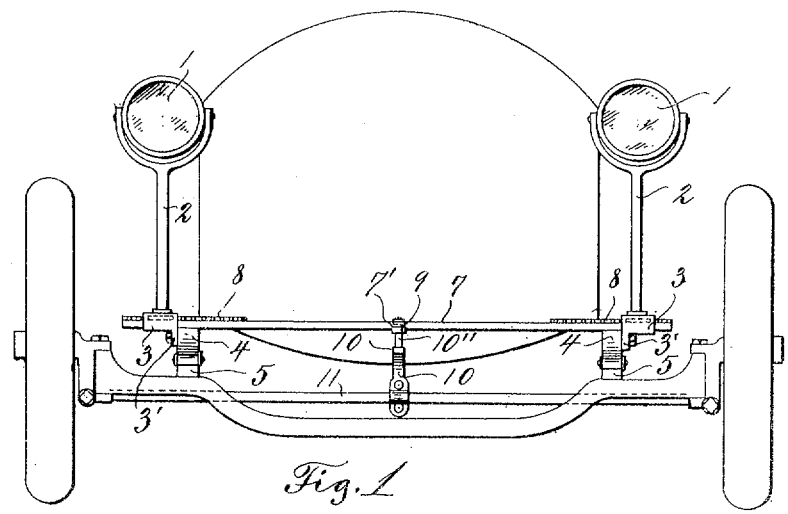
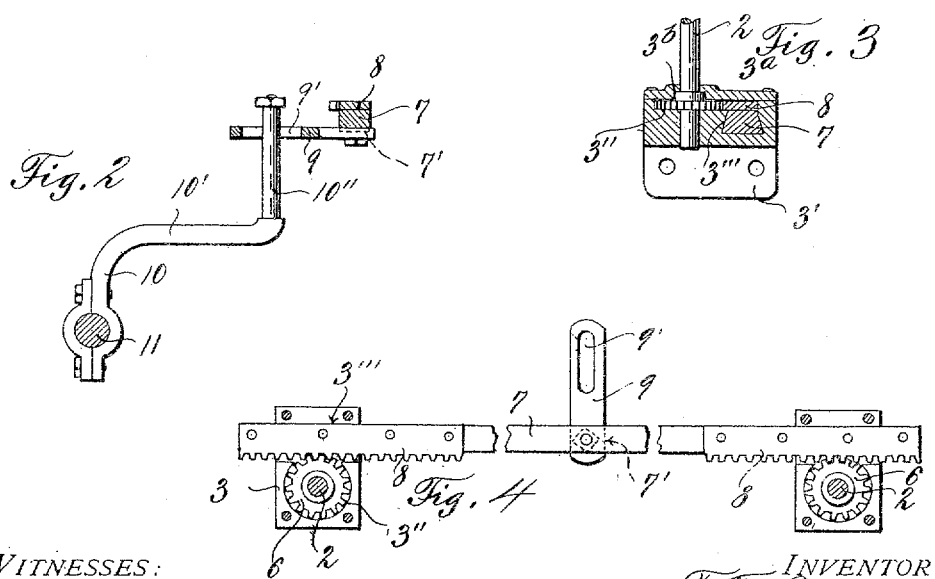

UNITED STATES PATENT OFFICE.

FELIX FRANCIS OGIER, OF BUTTE, MONTANA, ASSIGNOR OF ONE-FOURTH TO M. V. CONROY AND WILLIAM FITZGERALD, OF BUTTE, MONTANA.

DIRIGIBLE AUTOMOBILE-LAMP.

988,135.      Specification of Letters Patent.      Patented Mar. 28, 1911.

Application filed January 3, 1911. Serial No. 600,381.

*To all whom it may concern:*

Be it known that I, FELIX FRANCIS OGIER, a citizen of the United States, residing at Butte, in the county of Silverbow and State of Montana, have invented certain new and useful Improvements in Dirigible Automobile-Lamps, of which the following is a specification.

This invention relates to means whereby lamps are connected for operation with the steering mechanism of an automobile, rendering the same dirigible, or movable in accordance with the direction of forward movement of the automobile.

The object is to provide an efficient and simple mechanism of special construction by which the lamp is automatically directed so as to always throw the light in the direction in which the automobile is being steered.

Another object is to so construct said mechanism that the same may be easily applied to any automobile of the usual type and further the lamp operating means in the present invention is so designed that it may readily be adjusted to fit different sizes and constructions of machines.

With the above and other objects in view and for a clear understanding of the present invention, reference is to be had to the accompanying drawings, in which—

Figure 1 is a front view of an automobile provided with the invention; Fig. 2 is a fragmentary sectional view illustrating the shifting bracket secured on the steering rod and in connection with the lamp shifting bar; Fig. 3 is a transverse section through the bracket in which the lamp spindle is journaled; and Fig. 4 is a top plan of the shifting bar and the brackets carrying the lamp, the cover plates being removed and the lamp spindles shown in section.

Throughout the following detail description and on the several figures of the drawings, similar parts are referred to by like reference characters.

At 1 is indicated the usual type of automobile lamp mounted in the upper forked extremity of the spindle 2. The spindle 2 is mounted for rotation in a rack and gear supporting bracket 3 provided with a flanged portion 3' by which the bracket is held in position on the usual automobile frame members 4 carried on the springs 5 in the customary manner. The spindle 2 is provided with a gear 6 which is received for rotation with the spindle 2 in a recess 3'' in the bracket 3. A transverse shifting bar 7 is slidably mounted in a dovetail groove 3''' of the bracket 3, said shifting bar carrying at either end a rack 8 which is in mesh with the gear 6, by means of which the lamp spindle receives its motion when the direction of the automobile is changed by the steering mechanism.

A cover plate 3ᵃ is provided by which the gear 6 and the rack 8 at the point in mesh with said gear are suitably housed. Said plate has therein a recess 3ᵇ to receive the hub of the gear 6 and the bottom of said recess is so fitted to hold the lamp spindle in proper position in its bearing.

An arm 9 is detachably carried by the shifting bar 7 at a point intermediate its ends, said arm being slotted at one end, as at 9'. In order that the arm 9 may be more securely held in place on the shifting bar, it is provided with a recess 7' in which the said arm is snugly fitted. A shifting bracket 10 is securely clamped to the usual steering rod 11 of the automobile. Said bracket is provided with an arm 10' extending laterally by which an elongated stud 10'' is carried. The stud 10'' is adapted to be received in the slot 9' in the arm 9. To prevent accidental displacement, the stud 10'' is provided at its upper end with a nut and is made of ample length so as not to interfere with the spring action of the automobile. Further, it will be noted that the length of said stud coöperating with the slot 9' will allow for a variation in the relative positions of the steering rod and the shifting bar. By adjustment of the position of the bracket 10 on the steering rod a still greater variation in distance may be allowed between the steering rod and the shifting bar.

In operation the usual steering rod 11 by which the front wheels of the automobile are turned in the desired direction, is shifted transversely in the customary manner by the operator of the machine and as the lamp operating member 10 is carried by the steering rod, the same transverse movement will be imparted to the lamp shifting bar which in turn, by coöperation with the gear 6, will rotate the lamp spindle 2 and thereby adjust the lamp to throw the rays of light in the direction of movement of the automobile.

It is understood that the different parts of the present invention may be made of any suitable proportion and the details of construction may be varied within the scope of the claims.

Having thus described the invention, what is claimed as new is:—

In means of the class described, the combination of an automobile embodying frame members, detachable brackets mounted thereon and formed with dovetail grooves transversely thereof, a shifting bar having its ends of a cross section corresponding to the dove-tail grooves of the brackets and slidable therein, racks carried by the ends of the shifting bar, gears mounted on said brackets and meshing with the racks aforesaid, spindles secured to said gears, lamps carried by said spindles, plates detachably secured to the said brackets and housing the ends of the shifting bar seated in the grooves of the brackets and also housing the gears adjacent thereto, an arm projecting from the intermediate portion of the shifting bar and having its outer end slotted, and a shifting member carried by the steering rod and provided with an elongated stud engaging the slotted portion of the arm above mentioned, whereby the shifting bar and steering rod will be simultaneously moved.

In testimony whereof I affix my signature in presence of two witnesses.

FELIX FRANCIS OGIER.

Witnesses:
 PETER BREEN,
 H. K. JONES.

Copies of this patent may be obtained for five cents each, by addressing the "Commissioner of Patents, Washington, D. C."